(12) United States Patent
Kitamura et al.

(10) Patent No.: US 10,600,589 B2
(45) Date of Patent: Mar. 24, 2020

(54) KEYBOARD HAVING A SWITCH DEVICE

(71) Applicant: LENOVO (SINGAPORE) PTE. LTD., Singapore (SG)

(72) Inventors: Masahiro Kitamura, Kanagawa (JP); Mitsuo Horiuchi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/374,407

(22) Filed: Apr. 3, 2019

(65) Prior Publication Data

US 2019/0304718 A1 Oct. 3, 2019

(30) Foreign Application Priority Data

Apr. 2, 2018 (JP) .................. 2018-70598

(51) Int. Cl.
*H01H 13/705* (2006.01)
*H01H 13/88* (2006.01)
(Continued)

(52) U.S. Cl.
CPC ......... *H01H 13/705* (2013.01); *G06F 3/0202* (2013.01); *H01H 3/125* (2013.01); *H01H 13/88* (2013.01)

(58) Field of Classification Search
CPC ...... H01H 13/705; H01H 3/125; H01H 13/88; H01H 3/00; H01H 3/02; H01H 3/12; H01H 9/02; H01H 13/00; H01H 13/70; H01H 13/702; H01H 13/84; H01H 13/85; H01H 13/86; H01H 2003/00; H01H 2003/02; H01H 2003/12; H01H 2009/02; H01H 2201/00; H01H 2205/00; H01H 2205/004; H01H 2221/00; H01H 2223/00; H01H 2223/03; H01H 2231/002; H01H 2233/00; H01H 2233/002; H01H 2233/03;
(Continued)

(56) References Cited

U.S. PATENT DOCUMENTS 9,087,650 B2 * 7/2015 Ma ..................... H01H 3/122
9,837,220 B2 * 12/2017 Hou ..................... H01H 3/122
9,837,221 B2 * 12/2017 Liao ..................... H01H 3/125

FOREIGN PATENT DOCUMENTS

JP 2011171061 A * 9/2011
JP 2012-022473 A 2/2012

* cited by examiner

*Primary Examiner* — Edwin A. Leon
(74) *Attorney, Agent, or Firm* — Antony P. Ng; Russell Ng PLLC

(57) ABSTRACT

A switch device capable of preventing an occurrence of contact noise and wobbling of a stabilizer member to a bearing is provided. The key switch includes the stabilizer member supported between a key top and a base plate. The stabilizer member includes a first shaft portion rotatably supported on the lower surface side of the key top and a second shaft portion, which has a rotation axis parallel to the rotation axis of the first shaft portion and is rotatably supported by a bearing provided on the upper surface side of the base plate. The membrane sheet has at least a lower contact sheet having a cut-out shaped portion in a position corresponding to a position in which the second shaft portion is provided in a plane view and an upper contact sheet placed in an upper layer than the lower contact sheet to cover the cut-out shaped portion.

12 Claims, 6 Drawing Sheets

(51) Int. Cl.
*H01H 3/12* (2006.01)
*G06F 3/02* (2006.01)

(58) Field of Classification Search
CPC ........... H01H 2233/07; H01H 2237/00; H01H 2237/004; H01H 2239/006; H01H 2239/076; G06F 3/0202
USPC .......................................................... 200/517
See application file for complete search history.

KEYBOARD HAVING A SWITCH DEVICE

PRIORITY CLAIM

The present application claims benefit of priority under 35 U.S.C. §§ 120, 365 to the previously filed Japanese Patent Application No. JP2018-70598 with a priority date of Apr. 2, 2018, which is incorporated by reference herein.

TECHNICAL FIELD

The present invention relates to keyboards in general, and in particular to a keyboard having a switch device.

BACKGROUND

For a keyboard used in an electronic device such as a personal computer (PC), there is widely used a configuration including a base plate, a membrane sheet provided on the upper surface of the base plate, and a set of key switches disposed so as to be vertically movable on the upper surface side of the base plate.

In a keyboard, a wider key top than the key tops of other key switches is used for a space key or a shift key. This kind of wide key top may be twisted or inclined when the key top is depressed. The key top unstably moves vertically, which may lead to not only a deterioration of the operability or operation quality, but also a failure in detection of the depressing operation.

In order to overcome the above-mentioned problem, a stabilizer member, which is a metal rod-like member, can be provided between a space key and a base plate to stabilize the vertical movement of the key top. In a key switch provided with a metal stabilizer member, normally a bearing formed by cutting and raising a part of a metal base plate rotatably supports an end of the stabilizer member. In this situation, a gap is provided for a design to absorb a manufacturing tolerance between the stabilizer member and the bearing, and therefore a depressing operation of a key top generates contact noise due to contact of metals or causes wobbling between the bearing and the stabilizer member.

In order to prevent an occurrence of metallic sound and wobbling, grease can be applied to an area between the bearing and the stabilizer member. In the case of using grease, however, it requires a time-consuming grease coating operation and thus reduces manufacturing efficiency. Moreover, if the grease adheres to a worker's hand or to other components, a wiping work or the like therefor is required, by which the manufacturing efficiency is further reduced. In addition, this problem may occur similarly in devices other than the key switch of the keyboard device, such as, for example, various push-button type switch devices provided in an electronic device or the like.

Consequently, it would be desirable to provide an improved switch device capable of preventing an occurrence of contact noise and wobbling of a stabilizer member to a bearing.

SUMMARY

In accordance with an embodiment of the present disclosure, a switch device includes a base plate; a multi-layered membrane sheet laminated on an upper surface of the base plate; a push button provided so as to be vertically movable on the upper surface side of the membrane sheet, wherein a depressing operation is detected by the membrane sheet in the case where the push button is depressed; and a stabilizer member supported between the push button and the base plate; the stabilizer member includes a first shaft portion rotatably supported on the lower surface side of the push button and a second shaft portion, which has a rotation axis parallel to the rotation axis of the first shaft portion and is rotatably supported by a bearing provided on the upper surface side of the base plate; and the membrane sheet has at least a first sheet having a cut-out shaped portion in a position corresponding to a position in which the second shaft portion is provided in a plane view and a second sheet placed in an upper layer than the first sheet to cover the cut-out shaped portion.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Hereinafter, a switch device according to the present invention will be described in detail by giving an example of a keyboard device and an electronic device each having the switch device for preferable embodiments with reference to appended drawings.

Figure 1:
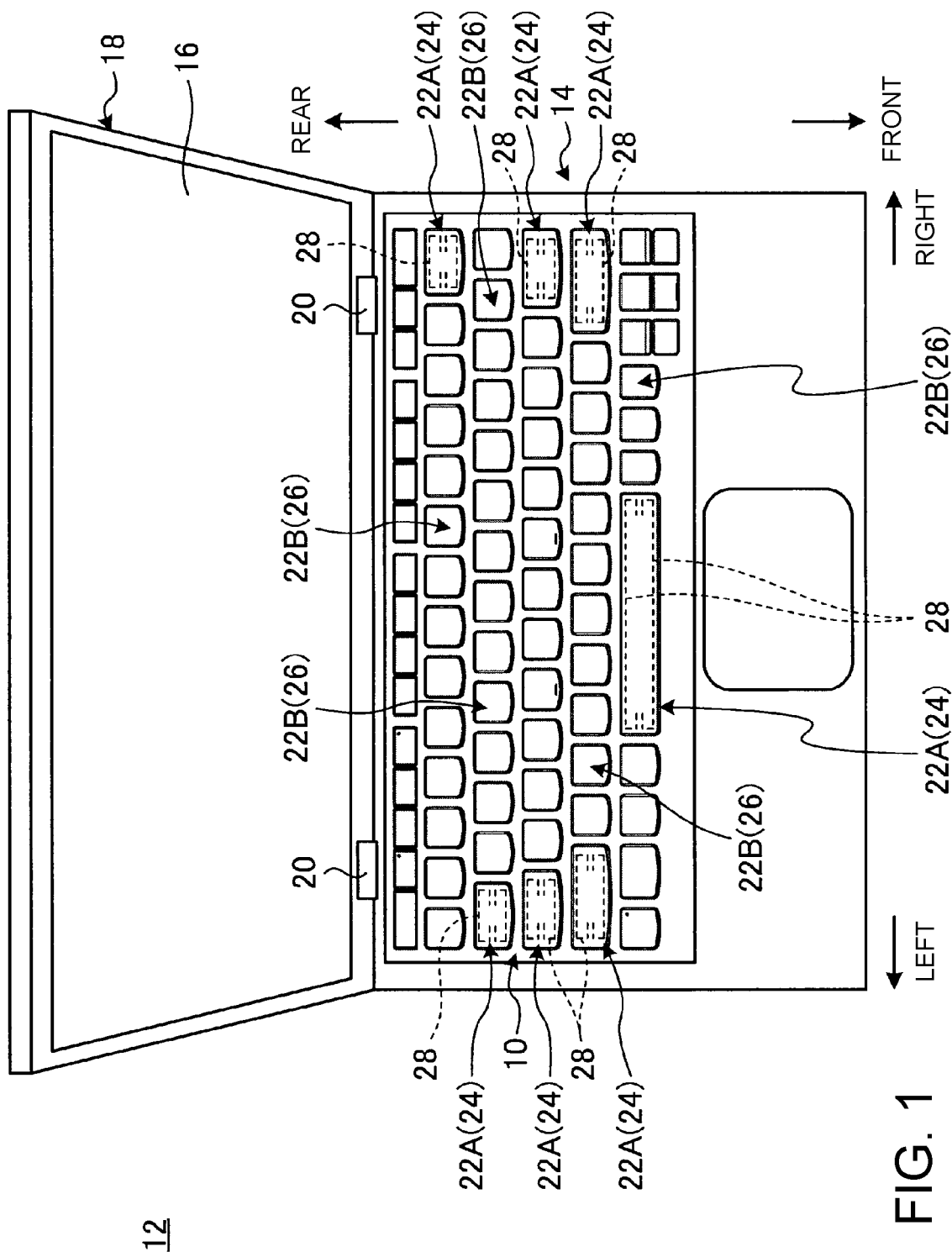
FIG. 1 is a diagram of an electronic device having a keyboard.

FIG. 1 is a diagram of an electronic device 12 having a keyboard device 10 according to one embodiment. The electronic device 12 is a laptop PC including a main body chassis 14 provided with the keyboard device 10 and a display chassis 18 provided with a display 16, which are openably and closably coupled to each other. Although this embodiment illustrates a configuration in which the keyboard device 10 is provided in the electronic device 12, which is a laptop PC, the keyboard device 10 may be an external keyboard device used in, for example, a desktop PC.

Hereinafter, the keyboard device 10 is described on the basis of a state in which the keyboard device 10 is mounted on the electronic device 12 as illustrated in FIG. 1, where the near side, the far side, the thickness direction, and the width direction are referred to as "front," "rear," "top and bottom," and "right and left," respectively.

The keyboard device 10 has a set of key switches 22A and a set of key switches 22B. As illustrated in FIG. 1, each key switch 22A has a key top 24 wide in the right-and-left direction and each key switch 22B has a key top 26 narrow in the right-and-left direction. The key switch 22A having the wide key top 24 is, for example, a space key, a Shift key, a Tab key, a Caps Lock key, a Back space key, an Enter key, or the like. The key switch 22B having the narrow key top 26 is, for example, an alphabet key, a numeric key, or the like.

The key tops 24 and 26 are each formed of a resin thin plate member. The key switch 22A is equipped with a stabilizer member 28 to prevent a torsion or an inclination of the wide key top 24.

Figure 2:
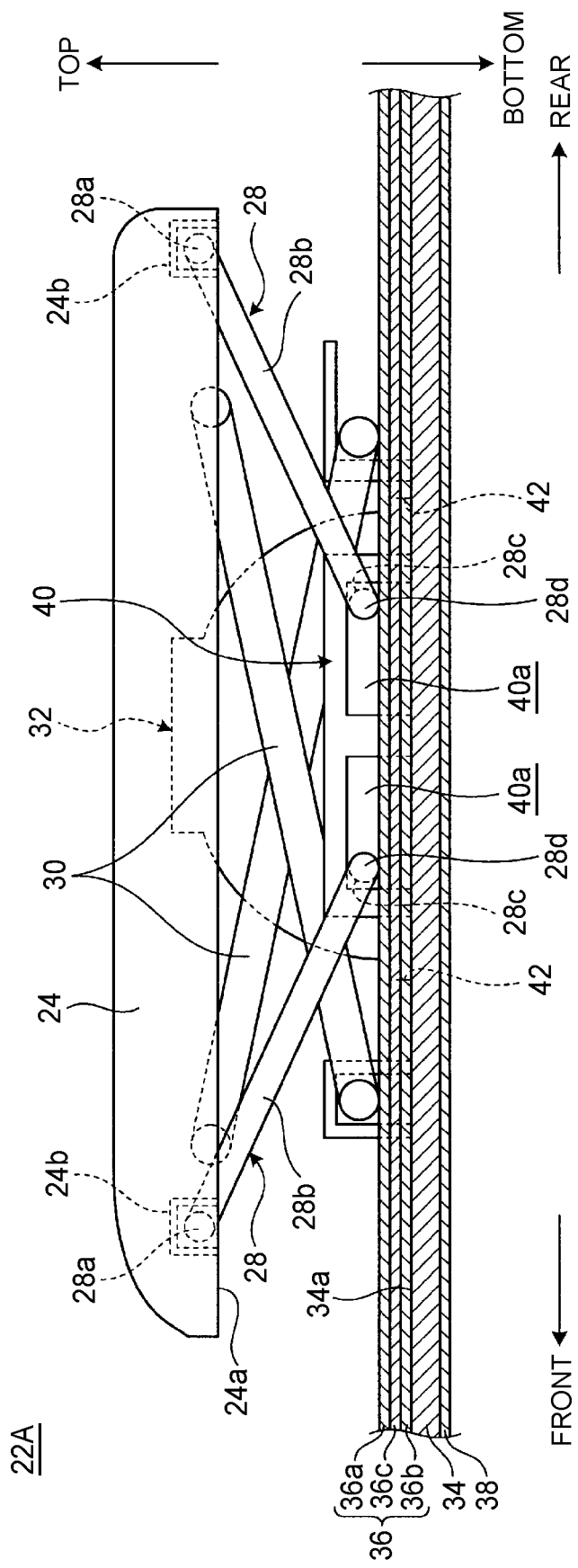
FIG. 2 is a side cross-sectional view illustrating a key switch having a wide key top.

FIG. 2 is a side cross-sectional view illustrating the key switch 22A having the wide key top 24. The key switch 22B having the narrow key top 26 is the same as or similar to the key switch 22A illustrated in FIG. 2 in the basic configuration except that the key switch 22B does not include the stabilizer member 28.

As illustrated in FIG. 2, the key switch 22A includes the key top 24, a guide mechanism 30, a rubber dome 32, a pair of stabilizer members 28 and 28, a base plate 34, and a membrane sheet 36.

The key top 24 is a push button depressed by a user with a fingertip. The guide mechanism 30 guides the vertical movement of the key top 24 on the upper surface 34a side of the base plate 34. The guide mechanism 30 is, for example, a pantograph mechanism extended between the lower surface 24a of the key top 24 and the upper surface 34a of the base plate 34. The guide mechanism 30 lands on the upper surface 34a of the base plate 34 through through-holes formed in various places of the membrane sheet 36. The rubber dome 32 is a dome-shaped member formed of elastic material having flexibility such as silicon rubber or the like and is disposed between the membrane sheet 36 and the key top 24. The rubber dome 32 is an elastic member that presses the membrane sheet 36 when the key top 24 is depressed and that returns the key top 24 to the initial position when the depressing operation of the key top 24 is released.

The base plate 34 is an attachment plate for the guide mechanism 30, the stabilizer member 28, the membrane sheet 36, and the like. The base plate 34 is made by cutting and raising or punching a metal thin plate member such as a stainless plate or an aluminum plate, for example, having a thickness of 0.3 mm. The base plate 34 and the membrane sheet 36 are provided on approximately the whole area of the keyboard device 10 and are shared by all key switches 22A and 22B.

In this embodiment, a backlight sheet 38 is laminated on the lower surface of the base plate 34. The backlight sheet 38 illuminates the respective key tops 24 from the lower surface side by guiding and reflecting light emitted from a light source such as LED elements or the like. The backlight sheet 38 may be omitted, and a waterproof sheet or the like may be provided, instead.

The membrane sheet 36 is laminated on the upper surface 34a of the base plate 34. The membrane sheet 36 is a sheet member having a three-layer structure with a spacer sheet (third sheet) 36c as a middle layer put between an upper contact sheet (a second sheet) 36a as the top layer and a lower contact sheet (a first sheet) 36b as a bottom layer. The upper contact sheet 36a and the lower contact sheet 36b have respective predetermined conductive patterns on surfaces opposed to each other across an internal space formed by the spacer sheet 36c. The membrane sheet 36 elastically deforms in the upper contact sheet 36a depressed by the rubber dome 32 when the key top 24 is depressed. As a result, the conductive pattern (a movable contact) on the upper contact sheet 36a side abuts against the conductive pattern (a fixed contact) on the lower contact sheet 36b side and the contacts are closed, thereby outputting a predetermined input signal according to the key type. The membrane sheet 36 may be a sheet member having a two-layer structure in which a contact sheet (a second sheet) with a comb-teeth switch pattern formed thereon is laminated on another sheet (a first sheet) and a metal dome switch provided instead of the rubber dome 32 contacts the second sheet, by which a switch circuit is formed, for example.

The stabilizer member 28 is supported between the key top 24 and the base plate 34. In this embodiment, a pair of stabilizer members 28 are provided for one key switch 22A in the front-and-rear direction as for the stabilizer member 28. The pair of stabilizer members 28 and 28 having the same shape are arranged symmetrically in the front-and-rear direction. As the stabilizer member 28, only one stabilizer member 28 may be mounted on one key switch 22A.

Figure 3:
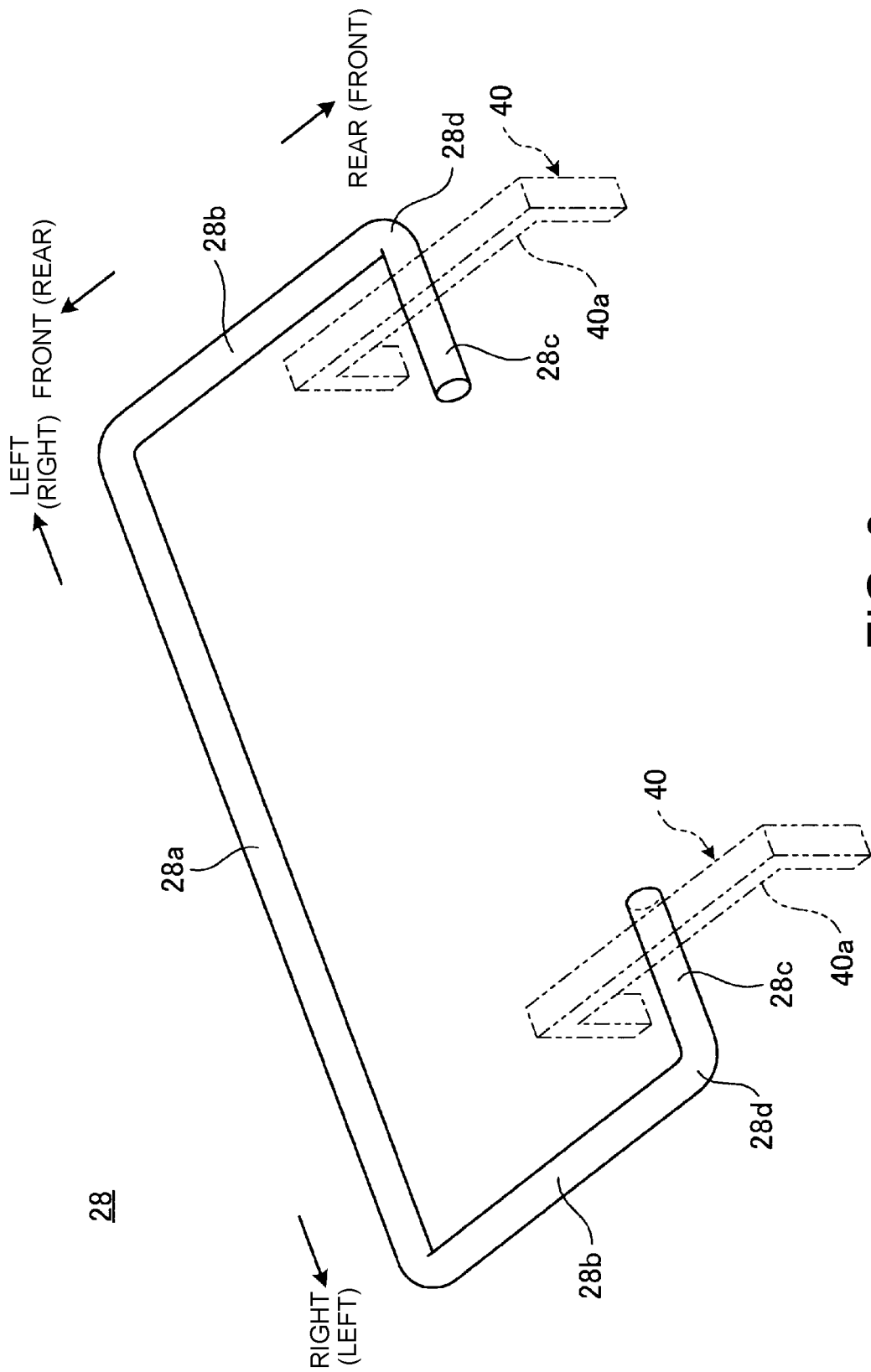
FIG. 3 is a perspective view illustrating a stabilizer member.

FIG. 3 is a perspective view illustrating the stabilizer member 28. As illustrated in FIGS. 2 and 3, the stabilizer member 28 is made by forming a thin rod-like member made of metal such as stainless steel, aluminum, or the like into a substantially C shape. The stabilizer member 28 includes a first shaft portion 28a, a pair of arm portions 28b and 28b, and a pair of second shaft portions 28c and 28c.

The first shaft portion 28a is a long rod-like part extending in the right-and-left direction. A pair of engaging portions 24b and 24b are provided in the front-and-rear direction on the lower surface 24a of the key top 24. The first shaft portion 28a of each stabilizer member 28 engages with the corresponding engaging portion 24b so as to be rotatable and immovable in a direction of axially intersecting with the engaging portion 24b. Thereby, the first shaft portion 28a rotates around a rotation axis along the right-and-left direction.

The respective arm portions 28b are short rod-like parts made by bending both ends of the first shaft portion 28a in the orthogonal direction to the axial direction of the first shaft portion 28a. Each arm portion 28b connects the first shaft portion 28a to the corresponding second shaft portion 28c. Each arm portion 28b is arranged so as to vertically incline along the front-and-rear direction (see FIG. 2).

Each second shaft portion 28c is a short rod-like part made by bending the end of each arm portion 28b toward the first shaft portion 28a so as to be parallel to the first shaft portion 28a. Thereby, the pair of second shaft portions 28c and 28c are coaxially arranged so as to be opposed to each other in the axial direction and rotates around the rotation axis parallel to the first shaft portion 28a. On the upper surface 34a side of the base plate 34, the bearing 40 is formed by cutting and raising. The bearings 40 have a pair of long holes 40a and 40a placed in the front-and-rear direction side by side so as to correspond to the pair of front and rear stabilizer members 28 and 28. The pair of bearings 40 are provided in the right-and-left direction so as to correspond to the pair of right and left second shaft portions 28c and 28c. Each second shaft portion 28c is inserted from the outside to the inside of an area between the bearings 40 and 40 with respect to the right and left bearings 40. Specifically, the right and left bearings 40 and 40 are located between the right and left arms 28b and 28b. Thereby, the second shaft portion 28c is supported so as to be rotatable in the long hole 40a and movable in the front-and-rear direction.

Figure 4:
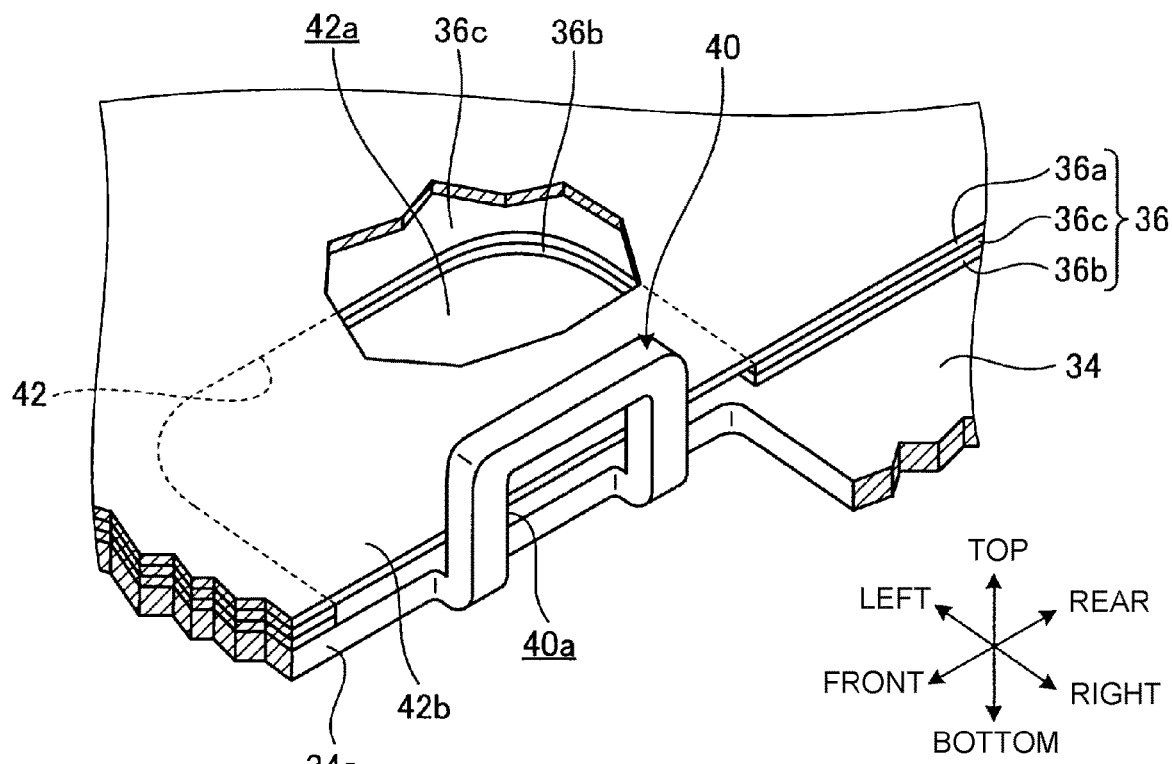
FIG. 4 is an enlarged perspective view illustrating a bearing and a peripheral portion before a stabilizer member is attached.
Figure 5:
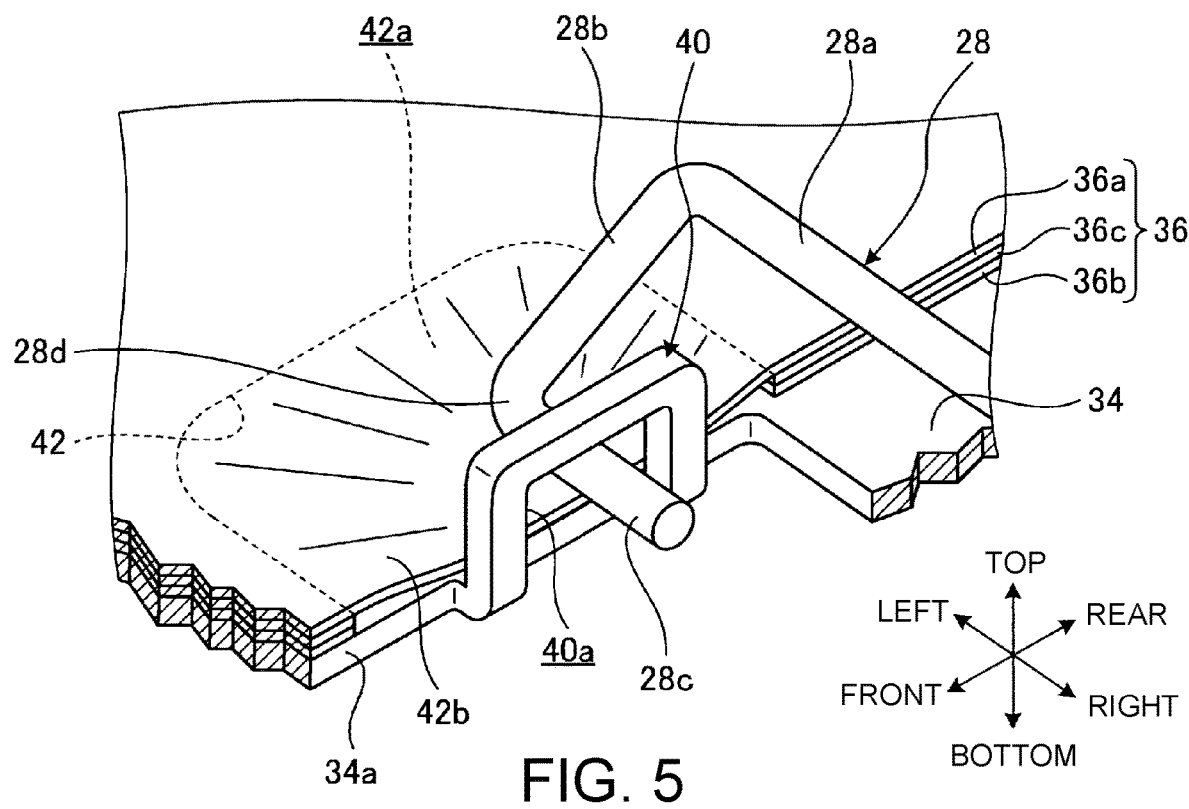
FIG. 5 is an enlarged perspective view illustrating the bearing and the peripheral portion after the stabilizer member has been attached.
Figure 6:
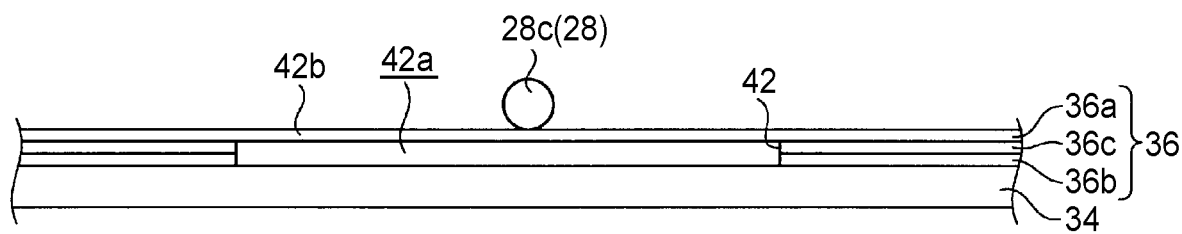
FIG. 6 is a side view illustrating a state in which a membrane sheet supporting a second shaft portion of the stabilizer member.

FIG. 4 is an enlarged perspective view illustrating the bearing 40 and a peripheral portion thereof before the stabilizer member 28 is attached. FIG. 5 is an enlarged perspective view illustrating the bearing 40 and the peripheral portion thereof after the stabilizer member 28 has been attached. FIG. 6 is a side view illustrating a state in which the membrane sheet 36 supports the second shaft portion 28c of the stabilizer member 28. In FIGS. 4 and 5, only one of the pair of long holes 40a and 40a formed in the bearings 40 is illustrated and only one of the pair of front and rear stabilizer members 28 and 28 is illustrated. Moreover, in FIG. 6, the bearing 40 and the second shaft portion 28c of the other stabilizer member 28 are not illustrated.

As illustrated in FIGS. 4 and 5, the bearing 40 is formed by cutting and raising the base plate 34 and stands on the side of a cut-out hole 34a formed in the base plate 34. As illustrated in FIGS. 4 to 6, the membrane sheet 36 extends to a position near the side of the bearing 40 and has a cut-out shaped portion 42 in a part along the edge of the cut-out hole 34a.

The cut-out shaped portion 42 has a shape in which a part of the lower contact sheet 36b and a part of the spacer sheet 36c are cut out into, for example, a rectangular shape, a semicircle, or the like in a plane view and opens toward one edge of the membrane sheet 36. Thereby, the membrane sheet 36 has a space 42a having a height of the thickness of the lower contact sheet 36b and the spacer sheet 36c on the lower surface side of the remaining upper contact sheet 36a in the part where the cut-out shaped portion 42 is formed. Therefore, a part covering the space 42a of the upper contact sheet 36a serves as a cushion portion 42b having a trampoline structure smoothly elastically deformable in the vertical direction.

The cut-out shaped portion 42 need not have a shape opening toward one edge of the membrane sheet 36, but may have a hollow shape enclosed by the membrane sheet 36 and the base plate 34 in the entire circumference. As a method of forming the cut-out shaped portion 42, the cut-out shaped portion 42 is formed, for example, by laminating the lower contact sheet 36b and the spacer sheet 36c, which are previously provided with a cutout shape that is a prototype of the cut-out shaped portion 42, and the upper contact sheet 36a. Specifically, the cut-out shaped portion 42 can be integrally formed at manufacturing the membrane sheet 36, thereby not requiring post-processing or the like and not decreasing the manufacturing efficiency.

As illustrated in FIGS. 5 and 6, the cushion portion 42b (the cut-out shaped portion 42) is arranged between the second shaft portion 28c inserted into the long hole 40a of the bearing 40 and the upper surface 34a of the base plate 34. More specifically, the cushion portion 42b (the cut-out shaped portion 42) is arranged in a position overlapping a bent portion 28d between the arm portion 28b and the second shaft portion 28c of the stabilizer member 28 and an area under the second shaft portion 28c in the near side inserted into the long hole 40a from the bent portion 28d. In other words, the membrane sheet 36 has the cut-out shaped portion 42 (the cushion portion 42b and the space 42a) arranged in a position corresponding to the position in which the second shaft portion 28c is provided in a plane view of the keyboard device 10.

Therefore, in the key switch 22A, the second shaft portion 28c is supported abutting on an area between the cushion portion 42b and the upper inner-wall surface of the long hole 40a in the initial state in which the key top 24 is not depressed. Specifically, the cushion portion 42b fills the gap between the second shaft portion 28c and the long hole 40a generated by a manufacturing tolerance, thereby preventing wobbling of the stabilizer member 28.

Furthermore, when the key top 24 is depressed, the stabilizer member 28 goes down together with the key top 24 while the first shaft portion 28a rotates in the engaging portion 24b. Thereupon, the second shaft portion 28c is pressed downward, while moving in the front-and-rear direction in the long hole 40a. For example, in FIG. 2, the second shaft portion 28c of the stabilizer member 28 on the front side moves backward in the long hole 40a. At this time, the second shaft portion 28c presses downward and elastically deforms the cushion portion 42b. Specifically, the cushion portion 42b smoothly sags toward the space 42a under the cushion portion 42b due to a pressing force of the second shaft portion 28c, and therefore a repulsive force of the cushion portion 42b substantially reduces the gap generated by the manufacturing tolerance between the second shaft portion 28c and the long hole 40a. As a result, the second shaft portion 28c is movable with a collision or wobbling thereof to the long hole 40a constantly prevented by the cushion portion 42b, thereby preventing an occurrence of a metallic sound or wobbling between the second shaft portion 28c and the bearing 40. Additionally, the key switch 22A prevents an occurrence of a metallic sound or wobbling between the second shaft portion 28c and the bearing 40, by which grease coating is not required. Therefore, grease coating operation is unnecessary and a manufacturing efficiency improves.

Incidentally, even if the stabilizer member 28 has a configuration in which the first shaft portion 28a is supported so as to be movable in the front-and-rear direction and rotatable by the engaging portion 24b and the second shaft portion 28c is supported so as to be immovable in the front-and-rear direction and rotatable by the bearing 40, it is possible to achieve advantageous effects of muting and preventing wobbling by the cushion portion 42b.

The cushion portion 42b supports the second shaft portion 28c along with the bent portion 28d extending from the arm portion 28b. Thereby, when the key top 24 is depressed and the stabilizer member 28 rotates, the bent portion 28d, which serves as a rotation fulcrum of the second shaft portion 28c on the cushion portion 42b, can be stably supported by the cushion portion 42b. Therefore, an occurrence of the metallic sound and wobbling between the second shaft portion 28c and the bearing 40 can be further prevented.

Although the above embodiment has illustrated the configuration in which the stabilizer member 28 is mounted only in the key switch 22A having the wide key top 24, the stabilizer member 28 (and the cushion portion 42b) can also be mounted on the key switch 22B having the narrow key top 26.

The above embodiment has illustrated the configuration in which the stabilizer member 28 is mounted on each key switch 22A of the keyboard device 10 and in which the second shaft portion 28c of the stabilizer member 28 is elastically supported by the cushion portion 42b of the membrane sheet 36. This configuration is also applicable to a switch device other than the key switch such as, for example, a push button or the like which works with a touchpad or a pointing stick installed in the keyboard device.

Figure 7:
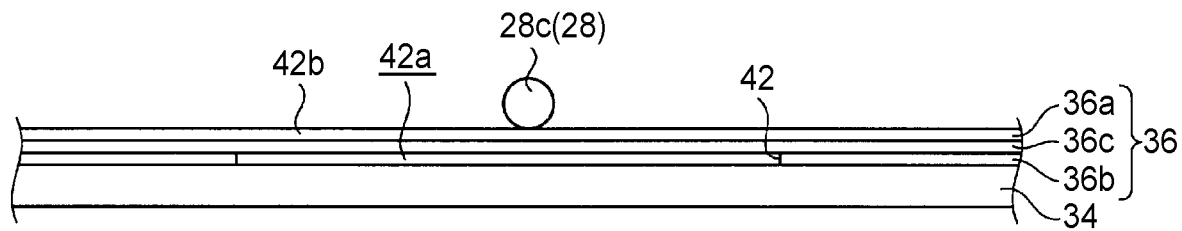
FIG. 7 is a side view illustrating a state in which a membrane sheet supporting the second shaft portion of the stabilizer member according to a first modification.
Figure 8:
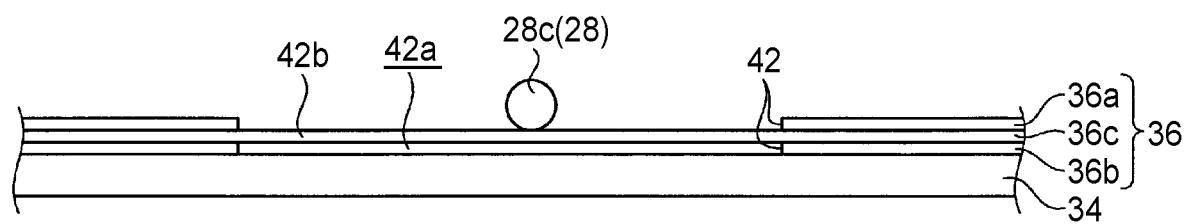
FIG. 8 is a side view illustrating a state in which a membrane sheet supporting the second shaft portion of the stabilizer member according to a second modification.
Figure 9:
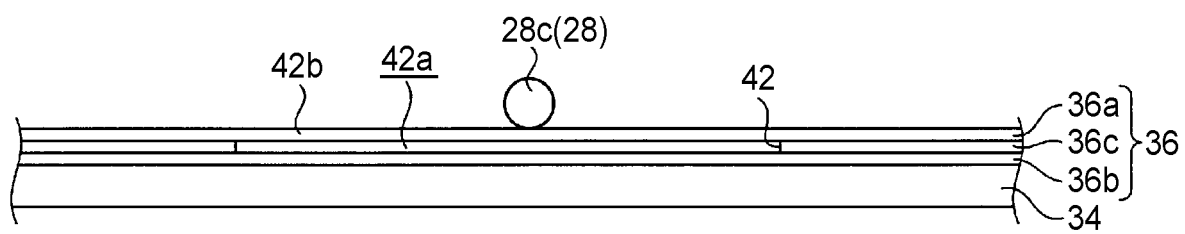
FIG. 9 is a side view illustrating a state in which a membrane sheet supporting the second shaft portion of the stabilizer member according to a third modification.

The above embodiment has illustrated a configuration in which the cut-out shaped portion 42 is provided in the respective sheets 36b and 36c (the first sheet) as the bottom layer and the middle layer of the membrane sheet 36 having the three-layer structure and in which the cut-out shaped portion 42 is covered with the upper contact sheet 36a (the second sheet) as the top layer. The cut-out shaped portion 42, however, may be formed only in, for example, the lower contact sheet 36b (the first sheet) as the bottom layer, so that the upper contact sheet 36a and the spacer sheet 36c (the second sheet) function as the cushion portion 42b (see FIG. 7). Moreover, the cut-out shaped portion 42 may be formed in, for example, the respective sheets 36a and 36c (the first sheet) as the top layer and the bottom layer, so that the spacer sheet 36c (the second sheet) as the middle layer functions as the cushion portion 42b (see FIG. 8). Furthermore, the cut-out shaped portion 42 may be formed only in, for example, the spacer sheet 36c (the first sheet) as the middle layer, so that the upper contact sheet 36a as the top layer functions as the cushion portion 42b (the second sheet) (see FIG. 9). In the case of the membrane sheet having a two-layer structure, the cut-out shaped portion 42 may be formed in a lower-layer sheet (the first sheet) and be covered with an upper-layer sheet (the second sheet).

As has been described, the present invention provides an improved switch device capable of preventing an occurrence of contact noise and wobbling of a stabilizer member to a bearing.

While the invention has been particularly shown and described with reference to a preferred embodiment, it will be understood by those skilled in the art that various changes in form and detail may be made therein without departing from the spirit and scope of the invention.

What is claimed is:

1. A switch device comprising:
a base plate;
a push button movable orthogonal to an upper surface side of said base plate when said push button is depressed;
a pair of stabilizer members supported between said push button and said base plate, wherein each of said pair of stabilizer members includes
a first shaft portion rotatably supported on a lower surface side of said push button; and
a second shaft portion, which has a rotation axis parallel to a rotation axis of said first shaft portion, rotatably supported by a bearing provided on said upper surface side of said base plate; and
a multi-layered membrane sheet located on an upper surface of said base plate, wherein said membrane sheet includes a first sheet in contact with said base plate, a second sheet in contact with said second shaft portion, and a third sheet in contact with said first and second sheets, wherein only said first sheet is provided with a cut-out shaped portion in an area corresponding to an area within which said second shaft portion is allowed to move.

2. The switch device of claim 1, wherein:
said second sheet is also provided with a cut-out shaped portion in said area corresponding to said area within which said second shaft portion is allowed to move, such that said second shaft portion is now in contact with said third sheet instead of said second sheet.

3. The switch device of claim 1, wherein:
said bearing and one other bearings are provided in positions opposed to each other so as to be corresponding to said pair of stabilizer members.

4. The switch device of claim 1, wherein:
said bearing has an opening extending in a direction orthogonal to said axial direction of said second shaft portion; and
an insertion of said second shaft portion into said opening supports said second shaft portion so as to be movable in an orthogonal direction to said axial direction of said second shaft portion.

5. A keyboard comprising:
a chassis; and
a plurality of switch devices contained within said chassis, wherein one of said switch devices includes
a base plate;
a push button movable orthogonal to an upper surface side of said base plate when said push button is depressed;
a pair of stabilizer members supported between said push button and said base plate, wherein each of said pair of stabilizer members includes
a first shaft portion rotatably supported on a lower surface side of said push button; and
a second shaft portion, which has a rotation axis parallel to a rotation axis of said first shaft portion, rotatably supported by a bearing provided on said upper surface side of said base plate; and
a multi-layered membrane sheet located on an upper surface of said base plate, wherein said membrane sheet includes a first sheet in contact with said base plate, a second sheet in contact with said second shaft portion, and a third sheet in contact with said first and second sheets, wherein only said first sheet is provided with a cut-out shaped portion in an area corresponding to an area within which said second shaft portion is allowed to move.

6. The keyboard of claim 5, wherein:
said second sheet is also provided with a cut-out shaped portion in said area corresponding to said area within which said second shaft portion is allowed to move, such that said second shaft portion is now in contact with said third sheet instead of said second sheet.

7. The keyboard of claim 5, wherein:
said bearing and one other bearings are provided in positions opposed to each other so as to be corresponding to said pair of stabilizer members.

8. The keyboard of claim 5, wherein:
said bearing has an opening extending in a direction orthogonal to said axial direction of said second shaft portion; and
an insertion of said second shaft portion into said opening supports said second shaft portion so as to be movable in an orthogonal direction to said axial direction of said second shaft portion.

9. An electric device comprising:
a display;
a keyboard having a plurality of switch devices, wherein one of said switch devices includes
a base plate;
a push button movable orthogonal to an upper surface side of said base plate when said push button is depressed;
a pair of stabilizer members supported between said push button and said base plate, wherein each of said pair of stabilizer members includes
a first shaft portion rotatably supported on a lower surface side of said push button; and
a second shaft portion, which has a rotation axis parallel to a rotation axis of said first shaft portion, rotatably supported by a bearing provided on said upper surface side of said base plate; and a multi-layered membrane sheet located on an upper surface of said base plate, wherein said membrane sheet includes a first sheet in contact with said base plate, a second sheet in contact with said second shaft portion, and a third sheet in contact with said first and second sheets, wherein only said first sheet is provided with a cut-out shaped portion in an area corresponding to an area with which said second shaft portion is allowed to move.

10. The electric device of claim 9, wherein:

said second sheet is also provided with a cut-out shaped portion in said area corresponding to said area within which said second shaft portion is allowed to move, such that said second shaft portion is now in contact with said third sheet instead of said second sheet.

11. The electric device of claim 9, wherein:

said bearing and one other bearings are provided in positions opposed to each other so as to be corresponding to said pair of stabilizer members.

12. The electric device of claim 9, wherein:

said bearing has an opening extending in a direction orthogonal to said axial direction of said second shaft portion; and an insertion of said second shaft portion into said opening supports said second shaft portion so as to be movable in an orthogonal direction to said axial direction of said second shaft portion.

\* \* \* \* \*